United States Patent
Maggio et al.

(10) Patent No.: US 11,575,404 B2
(45) Date of Patent: Feb. 7, 2023

(54) COMMUNICATION METHOD, CORRESPONDING SYSTEM AND DEVICE

(71) Applicant: STMICROELECTRONICS S.r.l., Agrate Brianza (IT)

(72) Inventors: Lucia Maggio, Milan (IT); Marzia Annovazzi, Buccinasco (IT); Diego Alagna, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/480,926

(22) Filed: Sep. 21, 2021

(65) Prior Publication Data
US 2022/0103201 A1  Mar. 31, 2022

(30) Foreign Application Priority Data
Sep. 25, 2020 (IT) .......................... 102020000022678

(51) Int. Cl.
*H04B 1/44* (2006.01)
*H04L 25/02* (2006.01)

(52) U.S. Cl.
CPC .......... *H04B 1/44* (2013.01); *H04L 25/0266* (2013.01)

(58) Field of Classification Search
CPC .............. H04B 1/38; H04B 1/40; H04B 1/44; H04B 3/30; H04B 3/50; H04L 5/14; H04L 5/22; H04L 25/0266; H04L 25/0268
USPC ........ 375/219, 220, 222, 257, 258; 370/282, 370/294–296; 455/73, 88, 553.1
See application file for complete search history.

(56) References Cited

U.S. PATENT DOCUMENTS

| | | | |
|---|---|---|---|
| 5,706,278 A | 1/1998 | Robillard et al. | |
| 9,313,804 B1 * | 4/2016 | de la Broise | H04B 15/00 |
| 9,680,528 B2 * | 6/2017 | Shrestha | H04B 5/005 |
| 10,678,726 B2 | 6/2020 | Rennig et al. | |
| 2002/0126806 A1 * | 9/2002 | Rahamim | H04M 11/066 379/93.05 |
| 2009/0027243 A1 * | 1/2009 | Leung | H01L 23/48 341/100 |

(Continued)

FOREIGN PATENT DOCUMENTS

| | | | |
|---|---|---|---|
| EP | 0 755 137 A1 | 1/1997 | |
| EP | 3 547 620 A1 | 10/2019 | |
| JP | 3839267 B2 * | 11/2006 | H01L 23/3107 |

*Primary Examiner* — Young T. Tse
(74) *Attorney, Agent, or Firm* — Seed Intellectual Property Law Group LLP

(57) ABSTRACT

A communication system has a galvanic isolation link coupling a first circuit to a second circuit. The first circuit transmits first data signals to the second circuit and receives second data signals from the second circuit in response to the first data signals. The data signals are transmitted in consecutive time slots of a determined time duration via the galvanic isolation link. The first data signals include polling signals transmitted from the first circuit to the second circuit during consecutive time slots, and on-demand access requests transmitted from the first circuit to the second circuit. The second data signals include status response signals transmitted from the second circuit to the first circuit in response to polling signals received from the first circuit, and access response signals transmitted from the second circuit to the first circuit in response to access requests received from the first circuit.

24 Claims, 5 Drawing Sheets

(56) References Cited

U.S. PATENT DOCUMENTS

2011/0289248 A1 11/2011 Djabbari et al.
2017/0353337 A1* 12/2017 Chakraborty ........... H04L 27/06

* cited by examiner

COMMUNICATION METHOD, CORRESPONDING SYSTEM AND DEVICE

BACKGROUND

Technical Field

The description relates to communication systems.

One or more embodiments can be applied to systems involving communication between a low-voltage (LV) side and a high-voltage (HV) side.

One or more embodiments can be applied to systems where safety represents an important factor. Traction, for car electrification, for instance, and power conversion are representative of possible areas of application of embodiments.

Description of the Related Art

In conventional electric motor control and power conversion applications comprising a control part and actuation part operating in a same power supply range no specific measures are contemplated in order to provide (electrical) isolation of these two sections.

Conversely, applications such as controlling electric motors used as engines for motor cars benefit from having a low-voltage control section adequately isolated from a high-voltage actuation section while preserving the capability for those two sections to safely communicate with each other.

High-voltage actuation (involving voltages of 800 V, for instance) plays a significant role in electric vehicles, with a high-voltage side adequately isolated from a low-voltage control side. Safe and fast communication between the control side and the power side is thus desirable.

Isolated communication protocols, using "smart" protocol arbitration contribute are desirable in order to comply with exacting safety and speed specifications involving isolation, safety and area (IC cost) as significant factors.

Achieving that result, with a low area usage in any integrated circuit (IC) involved is likewise desirable. In fact, IC area is a major contribution to the overall system cost. Keeping isolated communication simple with a reduced area usage is thus advantageous.

BRIEF SUMMARY

In an embodiment, a communication system has a galvanic isolation link coupling a first circuit to a second circuit. The first circuit transmits first data signals to the second circuit and receives second data signals from the second circuit in response to the first data signals. The data signals are transmitted in consecutive time slots of a determined time duration via the galvanic isolation link. The first data signals include polling signals transmitted from the first circuit to the second circuit during consecutive time slots, and on-demand access requests transmitted from the first circuit to the second circuit. The second data signals include status response signals transmitted from the second circuit to the first circuit in response to polling signals received from the first circuit, and access response signals transmitted from the second circuit to the first circuit in response to access requests received from the first circuit.

In an embodiment, a system, comprises: a first transceiver; a second transceiver; and a galvanic isolation link coupled between the first circuit and the second circuit, wherein, in operation: the first transceiver transmits first data signals to the second transceiver via the galvanic isolation link; and the second transceiver transmits, via the galvanic isolation link, second data signals to the first transceiver in response to the first data signals, wherein: the data signals are transmitted in consecutive time slots of a determined time duration via a galvanic isolation link coupled between the first circuit and the second circuit; the first data signals include: polling signals transmitted from the first transceiver to the second transceiver during consecutive time slots; and on-demand access requests transmitted from the first transceiver to the second transceiver; and the second data signals include: status response signals transmitted from the second transceiver to the first transceiver in response to polling signals received from the first transceiver; and access response signals transmitted from the second transceiver to the first transceiver in response to access requests received from the first transceiver.

In an embodiment, a transceiver comprises: control circuitry, which, in operation, couples to a processor; and an interface, which, in operation, couples the transceiver to a second transceiver via a galvanic isolation link, wherein, the transceiver, in operation: transmits first data signals to the second transceiver via the galvanic isolation link; and receives, from the second transceiver and via the galvanic isolation link, second data signals in response to the first data signals, wherein: the data signals are transmitted in consecutive time slots of a determined time duration via a galvanic isolation link; the first data signals include: polling signals transmitted from the transceiver to the second transceiver during consecutive time slots; and on-demand access requests transmitted from the transceiver to the second transceiver; and the second data signals include: status response signals transmitted from the second transceiver to the transceiver in response to polling signals; and access response signals transmitted from the second transceiver to the transceiver in response to access requests.

In an embodiment, a transceiver comprises: control circuitry, which, in operation, couples to a high-voltage device; and an interface, which, in operation, couples the transceiver to a second transceiver via a galvanic isolation link, wherein, the transceiver, in operation, responds to first data signals received from the second transceiver via the galvanic isolation link by transmitting second data signals in response to the first data signals, wherein: the data signals are transmitted in consecutive time slots of a determined time duration via a galvanic isolation link; the first data signals include: polling signals transmitted from the second transceiver to the transceiver during consecutive time slots; and on-demand access requests transmitted from the second transceiver to the transceiver; and the second data signals include: status response signals transmitted from the transceiver to the second transceiver in response to polling signals; and access response signals transmitted from the transceiver to the second transceiver in response to access requests.

In an embodiment, a non-transitory computer-readable medium's contents configure a communication system to perform a method, the method comprising: transmitting first data signals from a first circuit to a second circuit of the communication system; and transmitting second data signals from the second circuit to the first circuit in response to the first data signals, wherein: the data signals are transmitted in consecutive time slots of a determined time duration via a galvanic isolation link coupled between the first circuit and the second circuit; the first data signals include: polling signals transmitted from the first circuit to the second circuit during consecutive time slots; and on-demand access requests transmitted from the first circuit to the second circuit; and the second data signals include: status response signals transmitted from the second circuit to the first circuit in response to polling signals received from the first circuit; and access response signals transmitted from the second circuit to the first circuit in response to access requests received from the first circuit.

One or more embodiments may facilitate addressing the issues discussed in the foregoing.

According to one or more embodiments, a method (protocol) has the features set forth in the claims that follow.

One or more embodiments may relate to a corresponding system. A system including master device and a slave device configured to communicate with a protocol may be exemplary of such a system.

One or more embodiments may relate to a corresponding device. A high-voltage device, that is, a device whose operation involves high voltages (an electric motor used to provide traction power for a motor vehicle being a case in point) may be exemplary of such a system.

Features of embodiments may include one or more of the following:
 smart time sharing of transmission and reception windows;
 a same communication pattern (TX/RX window) used for managing master-slave messages and microcontroller-master device messages;
 digital encoding/decoding, such as Manchester facilitates clock recovery, optionally on a per-bit basis;
 fixed codes used for checking and reporting the good/fault status of a slave device (HV actuator, for instance); and/or
 automatic reset and restart of communication in case of line "stuck."

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

Figure 1:
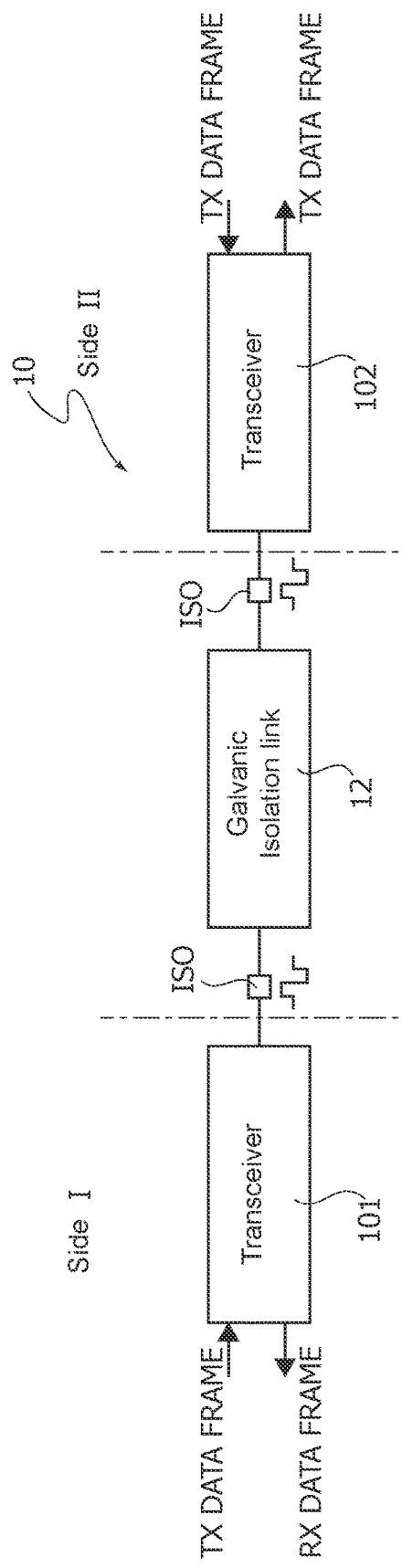
FIG. 1 is a block diagram of a conventional communication system including galvanic isolation.

FIG. 1 is a block diagram illustrative of a conventional communication system 10 comprising a galvanic isolation link 12 which may be used to provide communication between a "first" side I and a "second" side II.

Electrical, or galvanic, isolation is the condition in which:
 no appreciable direct current (DC) circulation takes place between two points of differing electrical potential: this condition corresponds to a notionally infinite electrical resistance between the two points, and
 electrical energy (a signal varying over time, for instance) can still be exchanged by other physical phenomena, such as electromagnetic induction, capacitive coupling, or light.

In a possible application context, the first and second sides I and II of the communication system 10 may be the (low-voltage) control side and the (high-voltage) power side of a traction system of a motor vehicle (not visible in the figures) where an electric motor is used as a source of traction power in the place of, or in combination with, a conventional internal combustion engine.

Of course, reference to that possible application context is merely illustrative and not limiting of the embodiments.

A system as illustrated in FIG. 1 comprises, on both sides I and II, a transmitter/receiver (transceiver) circuit 101 (side I) and 102 (side II) configured to:
 receive input data to be transmitted to the other side (TX DATA FRAME); and
 output data received from the other side (RX DATA FRAME).

Galvanic isolation (indicated by ISO in the figure), of the low-voltage side from the high-voltage side (together with possibility of exchanging data therebetween) is facilitated by a transformer or capacitor 12 which, on the one hand, counters transfer of DC signal components between the sides I and II and, on the other hand, facilitates propagation therebetween of AC signal components such as pulsed data signals.

All of the foregoing is conventional in the art, which makes it unnecessary to provide a more detailed description herein.

A conventional arrangement as illustrated in FIG. 1 can be regarded as essentially analog, with a digital part involved in providing a bitstream to be transmitted together with a clock signal.

An analog encoder block as included in both 101 and 102 builds the signal to be transmitted (for instance, a two-level pulsed signal corresponding to "1" and "0" symbols) starting from these two inputs. A likewise analog decoder block on the receiver side uses a dedicated oscillator (8 MHz, for instance) to reconstruct the data signal.

Such a solution does not facilitate testing. Also, power consumption may be high, with a corresponding high power consumption and IC semiconductor area occupation.

Additionally a solution as illustrated in FIG. 1 involves an oscillator for each receiver interface (on both sides I and II).

One or more embodiments as illustrated in system 20 of FIG. 2 (where parts or elements like or similar to parts or elements already discussed in connection with FIG. 1 are indicated with like reference symbols, so that a corresponding description will not be repeated for brevity) may retain the same system layout of FIG. 1 and adopt a communication protocol for managing communications between:

- a low-voltage controller MC such as, for instance, a microcontroller (MASTER, side I, by way of example), and
- an isolated high-voltage driver HVD (SLAVE, side II, once more by way of example) of a high-voltage ("user") device EM.

An electric motor used as a source of traction power in a motor vehicle in the place of, or in combination with, a conventional internal combustion engine may be exemplary of such a high-voltage device EM.

One or more silicon carbide field-effect transistors controlling current through the windings of such an electric motor EM may be exemplary of such isolated high-voltage driver HVD.

It is noted that both the low-voltage controller MC and the high-voltage driver HVD (and the high-voltage device EM) are outlined in dashed lines insofar as they may represent distinct elements from the embodiments.

Once again, galvanic isolation (ISO) of the low-voltage side I from the high-voltage side II (together with the possibility of exchanging data therebetween) can be provided at 12 (as exemplified by a capacitor).

Figure 2:
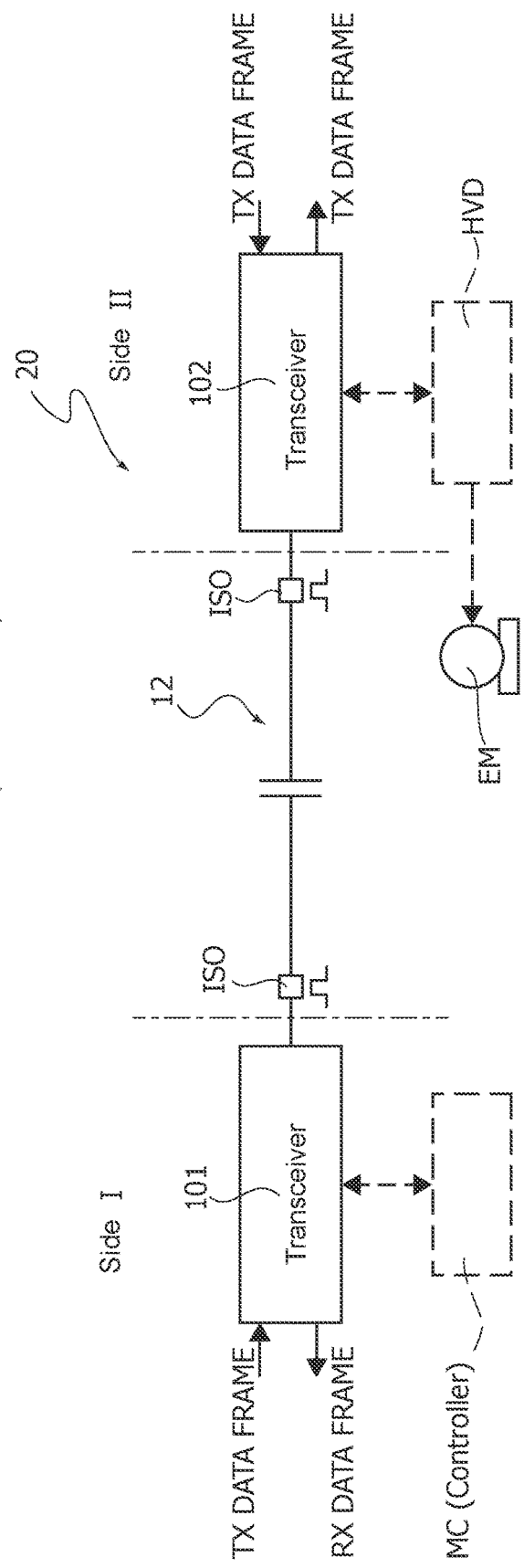
FIG. 2 is a block diagram of a communication system including galvanic isolation as per embodiments illustrated herein.

In one or more embodiments as illustrated in FIG. 2, communication may involve a "master" request followed by a "slave" answer.

In one or more embodiments, such an interplay may occur on a periodic basis (that is, within a time window CS for a request and an answer of fixed duration).

The duration of such a time window can be dimensioned as a function of the length (number of bits) of the transmitted messages plus the received messages, the oscillator frequency and precision and the delays of the analog driver of the (e.g., capacitive) link 12.

In one or more embodiments, the transceiver in the master device (here 101) may start communication independently from as response provide by the transceiver in the slave device (here 102).

In one or more embodiments, the slave device answer may start in response to an end of the master device request being detected.

This possible way of operation facilitates the slave device (here, by way of example, 102) in tracking the master device (here, by way of example, 101) even if the two devices have asynchronous time bases.

Also, if the microcontroller MC (which may be configured for Serial Peripheral Interface, SPI operation), issues a (new) request while another request is still on-going, the master device (here, 101, on the left) may be send a "busy" feedback to the microcontroller MC.

A read from the slave device (here, 102, on the right) can be loaded into a MISO (Master Input Slave Output) register ready to be sent to the microcontroller MC at a next Serial Peripheral Interface (SPI) access.

One or more embodiments may thus contemplate using a half-duplex protocol, which may be advantageous due to such communication involving only one wire.

One or more embodiments may adopt a protocol providing Manchester encoding/decoding of communication data which facilitates clock recovery (possibly on a per-bit basis), with smart time sharing for transmitting and receiving windows.

Figure 3:
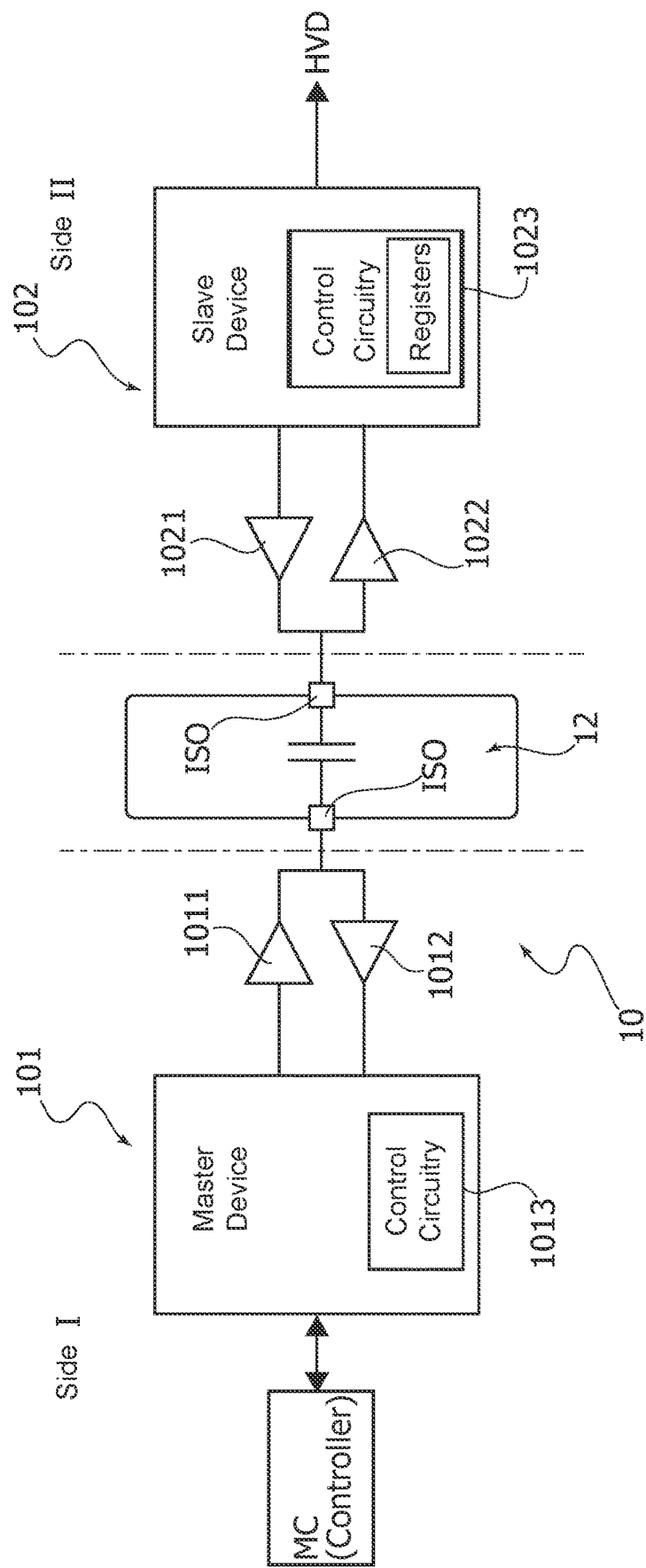
FIG. 3 is a block diagram illustrative of possible details of a system as illustrated in FIG. 2.

As further detailed in FIG. 3 (where, once again, parts or elements like parts or elements already discussed in connection with the previous figures are indicated with like reference symbols, so that a corresponding description will not be repeated for brevity) both the master device 101 and the slave device 102 (here on the left hand side I and on the right hand side II, respectively) comprise transmitter and receiver circuits 1011, 1012 (master device) and 1021, 1022 (slave device) configured—in a manner known per se to those of skill the art—to transmit and receive data signals through the galvanic isolation 112, ISO.

As illustrated, the transmitter and receiver circuits 1011, 1012 in the master device 101 operate under the control of control circuitry 1013 (for instance, an integrated communication interface or ICI, including configuration and status registers) configured to co-operate with the (micro)controller MC.

As illustrated, the transmitter and receiver circuits 1021, 1022 in the slave device 102 co-operate with control circuitry 1023 (for instance, an integrated communication interface or ICI, including configuration and status registers) configured to co-operate with the high voltage drive circuitry HVD (see FIG. 2).

Figure 4:
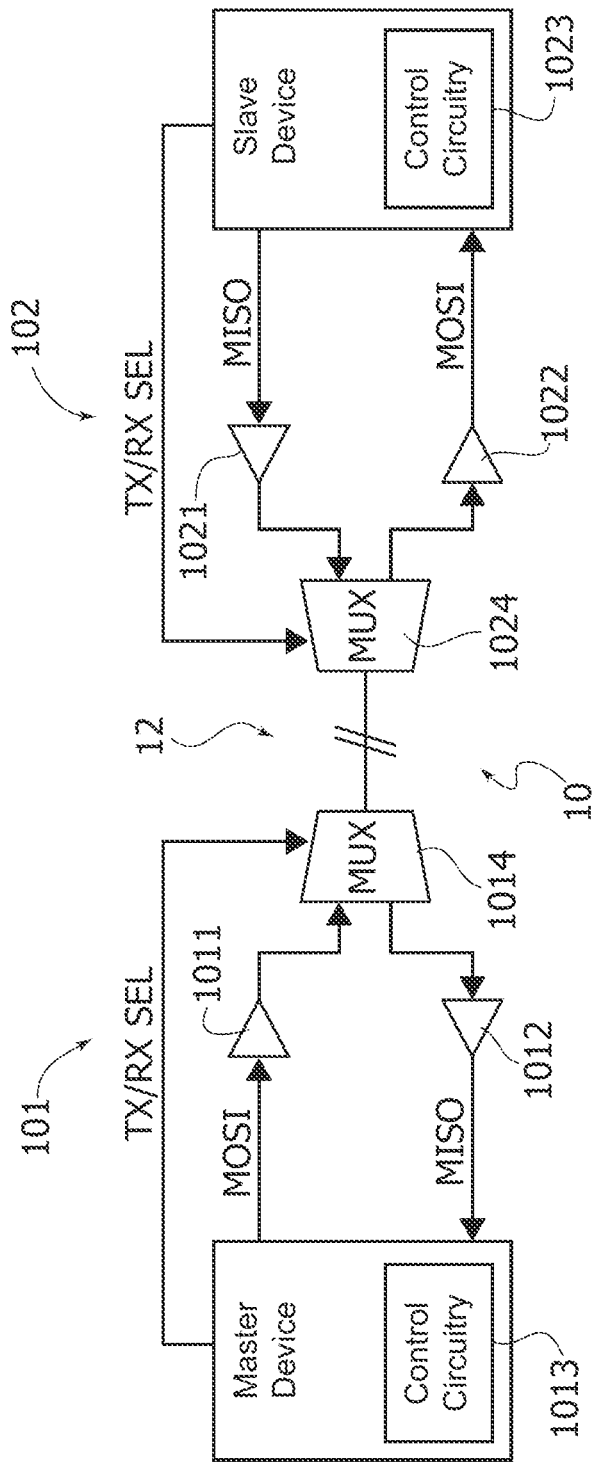
FIG. 4 is a circuit diagram illustrative of a possible implementation of a system as illustrated in FIGS. 2 and 3, and FIGS. 5 and 6 are time diagrams exemplary of operation of a communication system as per embodiments illustrated herein.

FIG. 4 reproduces for immediate reference parts or elements already introduced and discussed in the foregoing highlighting the role of these parts and elements in implementing a protocol to manage communications between the low-voltage side I and the high-voltage side II via integrated communication interfaces such as 1013 and 1023 for the "master" device 101 and the "slave" device 102, respectively.

In operation as illustrated herein, the interfaces 1013 and 1023 may issue switching control signals TX/SX SEL towards multiplexer circuits 1014, 1024 that control coupling of the transmitters 1011, 1021 and the receivers 1012, 1022 in order to facilitate single-wire half-duplex communication over the galvanically isolated channel 12.

That is:
- the transmitter 1011 (via multiplexer 1014) and the receiver 1022 (via multiplexer 1024) are coupled to the galvanically isolated channel 12 for transmission from side I (here, master) to side II (here slave), and
- the transmitter 1021 (via multiplexer 1024) and the receiver 1012 (via multiplexer 1014) are coupled to the galvanically isolated channel 12 for transmission from side II (here, slave) to side I (here master).

Flowpaths (lines) for corresponding Master Input Slave Output (MISO) and Master Output Slave Input (MOSI) messages are also represented in FIG. 4.

In one or more embodiments, a protocol as discussed herein can be rendered safe by a watchdog supervising communication activity in both directions.

As discussed, Manchester encoding/decoding can be advantageously selected in order to facilitate sending data and clock on a single line and for sending long messages (messages with many bits).

This approach also facilitates clock recovery at each bit which makes a system as illustrated tolerant to oscillator mismatch (even as high as 12%) between the master device and the slave device.

Operation as discussed above is exemplified in the diagrams of FIG. 5.

Those diagrams illustrate, plotted against a common (abscissa) time scale, possible time behaviors of (from top to bottom):
- messages (commands) ..., $C_{N-1}$, $C_N$, $C_{N+1}$, ... from the master device to the slave device (here, from device 101 to device 102),
- messages (commands) ..., $C'_{N-2}$, $C'_{N-1}$, ... from the slave device to the master device (here, from device 102 to device 101),
- the signal TX/RX SEL SLAVE controlling the multiplexer 1024 at the slave device 102,
- the signal TX/RX SEL MASTER controlling the multiplexer 1014 at the master device 101.

It is noted that messages such as ..., $C'_{N-2}$, $C'_{N-1}$, ... in the second diagram are interleaved with the messages (commands) ..., $C_{N-1}$, $C_N$, $C_{N+1}$, ... in the uppermost diagram with inter-frame safety guard intervals IF.

Communication as exemplified herein involves master device requests each followed by a slave device answer.

In one or more embodiments, communication can be started periodically by the master device 101 independently on any answer from the slave device 102.

Figure 5:
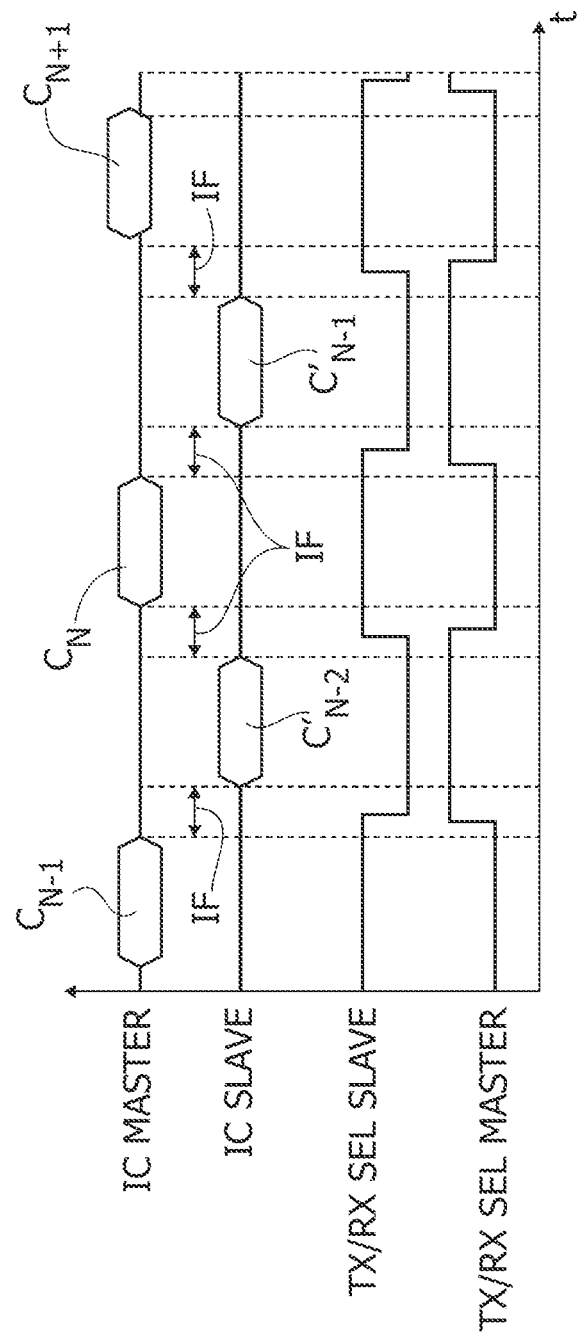

FIG. 5 illustrates that the answer from the slave device 102 is started in response to the end of the request from the master device 101 being detected.

As discussed, this facilitates having the slave device 102 "tracking" the master device 101 even if the two devices have asynchronous time bases.

In one or more embodiments, communication from the master device 101 can be started by a starting event and follow a fixed time base that is dimensioned as a function of the (cumulative) length of the message transmitted plus the received message (a—purely exemplary value) can be 51.2 microseconds for sending and receiving 24-bit messages.

Bidirectional communication can be managed on each side (side I, side II) by the TX/RX SEL signal (namely TX/RX SEL SLAVE and TX/RX SEL MASTER), which is used:
- in the device which (at the time) is transmitting data, to enable the transmitter—1011 or 1021—and disable the associate receiver —1012 or 1022).
- in the device which (at the time) is receiving data, to enable the receiver—1012 or 1022—and disable the associate transmitter —1011 or 1021).

Communication can start at the TX/RX SEL MASTER falling edge while is stopped at the TX/RX SEL SLAVE rising edge.

As illustrated, the transmitting and receiving windows are dimensioned and timed (IF intervals) in such a way to avoid overlap of transmitting and receiving events. This may take into account the length of the message(s), that is the number of bits therein, the oscillator frequency (and accuracy) and the delays of the analog driver of the capacitive line 12 providing the galvanic isolation.

The diagrams of FIG. 6, which again share common (abscissa) time scales, are illustrative of embodiments where the master device (here 101, on the low-voltage side I) is configured to send to the slave device (here 102, on the high-voltage side II) two types of messages 2001, 2001'.

A first type of low-voltage to high-voltage (LV to HV) message (two upper diagrams in FIG. 6) is a LV to HV message 2001 where the master device 101 polls the status of the slave device 102, which responds at 2002.

Such polling as exemplified at 2001 may involve a first type of access request, for instance a read request at a fixed register address in the interface 1023.

Polling may be performed continuously (e.g., with a 24-bit constant code) at every communication slot CS (every 51.2 microseconds, for instance).

Figure 6:
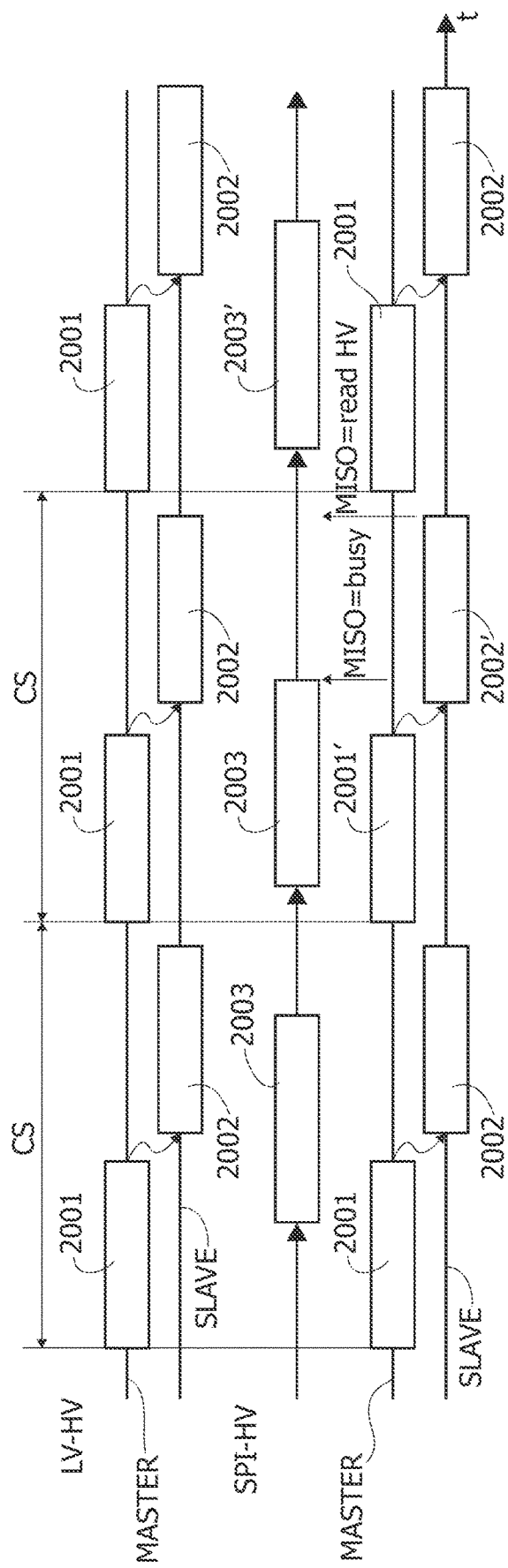

As exemplified in the two lower diagrams in FIG. 6, a second type of low-voltage to high-voltage (LV to HV) message may be prompted (by a SPI-HV message 2003) where the master device 101 sends to the slave device 102 a second type of message 2001', for instance a write request at any register address in the interface 1023 or a read request at any register address in the interface 1023 (other than the one possibly used to send the polling messages 2001).

The message 2001' may be prompted by an out-of-frame access request 2003 (SPI for instance) from the microcontroller MC and may result in action taken at the slave side 102 as exemplified at 2002'.

As illustrated in FIG. 6, the communication protocol and the communication windows (e.g., 24-bit constant code) for the messages 2001' (and the action at 2002') can be the same of the polling messages 2001, 2002 discussed previously, with the incoming SPI-HV message possibly finalized in the next slot at the end of an on-going polling message.

As noted, the (second type of) message 2001' may convey a write/read access to a register on the slave side 102 (ICI 1023).

Considering by way of simplicity the exemplary case of a read request (originated from the controller MC), if the access request 2003 from the microcontroller MC is received while another (e.g., polling) request is ongoing, the LV master device (here 101) may send a "busy" feedback (MISO=busy) to the microcontroller MC.

Under these circumstances, the read received from the HV device 102 (MISO=read HV) can be loaded into a MISO register and then sent to the microcontroller MC at the next SPI access (see 2002', 2003' in FIG. 6, where 2003' denotes a SPI MISO=read HV message received by the microcontroller MC).

As discussed, one or more embodiments may use simple (constant) codes such as 24-bit constant codes, for instance, for communicating requests and status (see 2001 and 2002, for instance).

For instance, the master device 101 may send 24-bit constant code for polling for the status of the slave device 102 and the slave device 102 may answer with 24-bit constant codes indicating good status, fault status, communication error.

A same format (24 bit, for instance) can be used for the messages 2001' and 2002', and, advantageously, for the requests 2003.

In both the master device 101 and the slave device 102 a watchdog may be provide to reset the communication logic—putting it in an idle state—if no received message is detected for more that, e.g., four communication slots CS.

Such a reset can be made temporary, with communication restarted from the master device 101 with a transmission event.

One or more embodiments facilitate letting a LV controller interface at 101 and a HV driver interface at 102 communicate with each other with an isolated protocol in a single IC, achieving communication speed, communication safety and reduced cost in terms of area.

In comparison with essentially analog solutions, one or more embodiments provide advantages in terms of testability, area reduction, and robustness to noise.

Digital encoding/decoding of communication data (Manchester for instance) provide a simple mechanism for managing a bidirectional communication line.

Time division between transmit and receive windows, together with a slave device capable of tracking the master device facilitates synchronization and contribute in avoiding conflicts (collisions). Encoder and decoder logic may include a small number of gates, with registers on one side (HV registers) not duplicated on the other side (LV side).

Advantageously, no FIFO (First-In First-Out) queuing or additional blocks are involved on the LV side to record HV information: HV replies are loaded directly in a MISO.

A smart time sharing mechanism is adopted for transmission and reception time windows, capable of providing automatic and fast interrogation of HV (slave) status in addition to complying with requests from a microcontroller such as MC.

The microcontroller MC can receive a reply to a request in two SPI frames (out-of-frame message OOF) the microcontroller MC obtains the reply. In that way, the microcontroller MC can be made aware of the driver state every 51.2×2 µs, for instance.

In one or more embodiments, the LV side (here side I) may communicate with a microcontroller such as MC via SPI interface. A microcontroller such as MC can address configuration or diagnostic registers regarding both the LV side (side I) and the HV driver (side II).

A request regarding the LV side can be dealt with within the LV side itself (thus facilitating completing LV requests in a short time). Conversely, if a request concerns the HV side, the LV side may take control of the communication line and wait for the HV reply.

In one or more embodiments, a same communication pattern (TX/RX window) can be used for master-to-slave and microcontroller-to-master messages.

Use of fixed codes in investigating and reporting the good/fault status of the slave device (HV actuator) part along with increased safety of the line facilitated by watchdog supervision along with automatic reset and restart of communication in case of line in stuck are other advantageous features of the embodiments.

One or more embodiments may facilitate communication between a low-voltage side and a high-voltage side within a single IC resorting to a simple, fully digital (and fully testable) arrangement, preserving adequate isolation, while having a reduced area occupation complying with safety specifications.

Activity (that is, exchange of signals) over an isolated capacitive line as discussed herein and periodicity of the query and answer slots can be observed and measured during automatic polling and during microcontroller requests. In case of automatic polling the query and answer frames (constant 24-bit codes) can be recognized.

In case of a fault on the HV side (side II), the answer frame can be a constant 24-bit code reporting the fault status.

In case of a request from a microcontroller such as MC (side I) to the HV side (side II) the answer sent to can again be a constant 24-bit "busy" code which is repeated at each subsequent request until the answer is recovered from the HV isolated side (side II).

A method (protocol) as exemplified herein may comprise (with example references to the figures):
  exchanging data signals (for instance, 2001, 2002, 2001', 2002') via a galvanic isolation link (for instance, ISO, 12) coupling a first unit or circuit (for instance, 101) and a second unit or circuit (for instance, 102), wherein exchanging data signals occurs in subsequent time slots (for instance, CS) of fixed time duration (and periodical occurrence, 51.2 µs, for instance) during which first data signals (for instance, 2001, 2001') are sent from the first unit and received by the second unit and second data signals (for instance, 2002, 2002') are sent from the second unit in response to first data signals received from the first unit,
wherein:
  the first data signals comprise polling signals (for instance, 2001) sent from the first unit to the second unit at each one of said subsequent time slots as well as on-demand requests (for instance, 2001') sent from the first unit to the second unit in response to respective accesses (for instance, 2003, 2003') to said first unit (for instance, by the microcontroller MC), and
  the second data signals comprise status response signals (for instance, 2002) sent from the second unit in response to polling signals from the first unit as well as read signals (for instance, 2002') from the second unit sent from the second unit in response to on-demand requests (for instance, 2001') from the first unit.

A method as exemplified herein may comprise:
  keeping in store a read signal (for instance, 2002') from the second unit pending completion of sending a status response signal (for instance, 2002) from the second unit to the first unit, and
  sending (for instance, MISO=read HV) said read signal kept in store in response to a respective (subsequent) access (for instance, 2003') to said first unit.

For instance, as exemplified in FIG. 6, the foregoing may involve the following procedure:
  a request (read and write) 2003 from the microcontroller MC is kept in store as long as an on-going message 2002 is completed, and
  a corresponding response 2002' is stored and retrieved at a "next" access by the microcontroller MC.

A method as exemplified herein may comprise the first unit issuing a busy state signal (for instance, MISO=busy) indicative of said pending completion of sending a status response signal from the second unit to the first unit.

In a method as exemplified herein, the second unit may comprise registers (for instance, 1023), and:
  the polling signals sent from the first unit to the second unit may comprise a first type of access requests (for instance, read) to said registers in the second unit, and
  the on-demand requests sent from the first unit to the second unit may comprise a second type of access requests (for instance, write or read) to said registers in the second unit, the second type of access requests being different from the first type of access requests.

In a method as exemplified herein:
  the registers in the second unit may have register addresses,
  the first type of access requests to said registers in the second unit may comprise access requests to a single one of said register addresses in the second unit, and
  the second type of access requests to said registers in the second unit may comprise access requests to a plurality of said register addresses in the second unit.

In a method as exemplified herein:
  the first data signals (for instance, 2001, 2001') and the second data signals (for instance, 2002, 2002') may be mutually non-overlapping (see, for instance, IF or TX/RX SEL MASTER and TX/RX SEL SLAVE in FIG. 5); and/or
  the first data signals and the second data signals may comprise a same number of bits (for instance, 24 bits); and/or the first data signals and the second data signals may comprise digitally-encoded signals, optionally using Manchester code; and/or the polling signals from the first unit to the second unit and the status response signals from the second unit to the first unit may comprise constant-content digital signals.

A method as exemplified herein may comprise:

watching absence of data signals (for instance, 2001, 2002, 2001', 2002') sent via said galvanic isolation link, in response to absence of data signals sent over said galvanic isolation link being detected by one of said first unit and said second unit for a threshold number of said subsequent time slots (for instance, four time slots CS), resetting said one of said first unit (101) and said second unit (102) and restarting operation with a first data signal (for instance, 2001, 2001') sent from the first unit and received by the second unit.

A communication system (for instance, 10) as exemplified herein, may comprise a first unit and a second unit coupled via a galvanic isolation link, wherein the first unit and the second unit may be configured to exchange data signals with the method as exemplified herein.

A system as exemplified herein may comprise a controller (for instance, MC) configured to:

send to the first unit said respective requests (for instance, 2003), and receive from the first unit said read signals read from the second unit sent from the second unit to the first unit in response to said on-demand requests.

In a system as exemplified herein:

the first unit may comprise a low-voltage circuit configured to control a high-voltage device (for instance, EM), and the second unit may be configured to be coupled (for instance, via drive unit such as HVD) to said high-voltage device, wherein the galvanic isolation link provides isolation of said low-voltage control circuit with respect to said high-voltage device.

A high-voltage device (for instance, an electric motor such as EM) may be equipped with a system as exemplified herein, wherein said second unit is coupled to said high-voltage device and said first unit is configured to control said high-voltage device with the galvanic isolation link providing isolation of said low-voltage control circuit with respect to said high-voltage device.

In an embodiment, a communication system has a galvanic isolation link coupling a first circuit to a second circuit. The first circuit transmits first data signals to the second circuit and receives second data signals from the second circuit in response to the first data signals. The data signals are transmitted in consecutive time slots of a determined time duration via the galvanic isolation link. The first data signals include polling signals transmitted from the first circuit to the second circuit during consecutive time slots, and on-demand access requests transmitted from the first circuit to the second circuit. The second data signals include status response signals transmitted from the second circuit to the first circuit in response to polling signals received from the first circuit, and access response signals transmitted from the second circuit to the first circuit in response to access requests received from the first circuit.

In an embodiment, a method comprises transmitting first data signals from a first circuit to a second circuit; and transmitting second data signals from the second circuit to the first circuit in response to the first data signals. The data signals are transmitted in consecutive time slots of a determined time duration via a galvanic isolation link coupled between the first circuit and the second circuit. The first data signals include polling signals transmitted from the first circuit to the second circuit during consecutive time slots, and on-demand access requests transmitted from the first circuit to the second circuit. The second data signals include status response signals transmitted from the second circuit to the first circuit in response to polling signals received from the first circuit, and access response signals transmitted from the second circuit to the first circuit in response to access requests received from the first circuit. In an embodiment, the method comprises storing, in the second circuit, a response to an access request; transmitting, by the second circuit, of a status response signal before transmission of an access response signal associated with the stored response; and transmitting, by the second circuit after the transmission of the status response signal, the access response signal associated with the stored response. In an embodiment, the method comprises: sending, by the first circuit to a controller coupled to the first circuit, a busy state signal indicative of pending completion of transmission of the status response signal by the second circuit to the first circuit. In an embodiment, the second circuit includes registers; the polling signals transmitted from the first circuit to the second circuit comprise a first type of access requests to access registers in the second circuit; and the on-demand access requests transmitted from the first circuit to the second circuit comprise a second type of access requests to access registers in the second circuit, the second type of access requests being different from the first type of access requests. In an embodiment, the registers in the second circuit have register addresses; the first type of access request are directed to single addresses of the register addresses of the second circuit; and the second type of access requests are directed to plural register addresses of the second circuit. In an embodiment, the first data signals and the second data signals are mutually non-overlapping; the first data signals and the second data signals comprise a same number of bits; the first data signals and the second data signals comprise digitally-encoded signals; the polling signals transmitted from the first circuit to the second circuit and the status response signals transmitted from the second circuit to the first circuit comprise constant-content digital signals; or combinations thereof. In an embodiment, the method comprises encoding the digitally encoded signals using Manchester code. In an embodiment, the method comprises: detecting an absence of data signals being transmitted between the first circuit and the second circuit via said galvanic isolation link; and responding to the detecting of the absence of data signals being transmitted between the first circuit and the second circuit via said galvanic isolation link by: resetting one or both of the first circuit and the second circuit; and transmitting a first data signal from the first circuit to the second circuit. In an embodiment, the detecting comprises: determining, using one of the first circuit or the second circuit, whether a threshold number of consecutive time slots have elapsed without a data signal being transmitted between the first circuit and the second circuit via said galvanic isolation link.

In an embodiment, a system, comprises: a first transceiver; a second transceiver; and a galvanic isolation link coupled between the first circuit and the second circuit, wherein, in operation: the first transceiver transmits first data signals to the second transceiver via the galvanic isolation link; and the second transceiver transmits, via the galvanic isolation link, second data signals to the first transceiver in response to the first data signals, wherein: the data signals are transmitted in consecutive time slots of a determined time duration via a galvanic isolation link coupled between the first circuit and the second circuit; the first data signals include: polling signals transmitted from the first transceiver to the second transceiver during consecutive time slots; and on-demand access requests transmitted from the first transceiver to the second transceiver; and the second data signals include: status response signals transmitted from the second transceiver to the first transceiver in response to polling signals received from the first transceiver; and access response signals transmitted from the second transceiver to the first transceiver in response to access requests received from the first transceiver. In an embodiment, the second transceiver, in operation: stores a response to an access request; transmits a status response signal before transmission of an access response signal associated with the stored response; and transmits, after the transmission of the status response signal, the access response signal associated with the stored response. In an embodiment, the first transceiver, in operation, sends a busy state signal to a controller coupled to the first circuit, the busy state signal indicating pending reception of the status response signal. In an embodiment, the second transceiver includes registers having register addresses; the polling signals transmitted from the first transceiver to the second transceiver comprise a first type of access requests to access single register addresses of the register addresses of the second transceiver; and the on-demand access requests transmitted from the first transceiver to the second transceiver comprise a second type of access requests to access plural register addresses of the register addresses of the second transceiver. In an embodiment, the first transceiver, in operation: detects an absence of data signals being transmitted between the first transceiver and the second transceiver via the galvanic isolation link, the detecting including determining whether a threshold number of consecutive time slots have elapsed without a data signal being transmitted between the first transceiver and the second transceiver via said galvanic isolation link; and responds to the detecting of the absence of data signals being transmitted by: resetting one or both of the first transceiver and the second transceiver; and transmitting a first data signal to the second transceiver via the galvanic isolation link. In an embodiment, the system comprises a controller coupled to the first transceiver, wherein: the controller, in operation sends an on-demand access request to the first transceiver; the first transceiver, in operation: forwards the on-demand access request to the second transceiver via the galvanic isolation link; receives a response to the on-demand access request from the second transceiver via the galvanic isolation link; and forwards the response to the on-demand access request to the controller. In an embodiment, the first transceiver comprises a low-voltage circuit, which, in operation, generates signals to control a high-voltage device; and the second transceiver, in operation is coupled to the high-voltage device, wherein the galvanic isolation link, in operation, isolates the low-voltage control circuit with respect to the high-voltage device. In an embodiment, the system comprises the high-voltage device.

In an embodiment, a transceiver comprises: control circuitry, which, in operation, couples to a processor; and an interface, which, in operation, couples the transceiver to a second transceiver via a galvanic isolation link, wherein, the transceiver, in operation: transmits first data signals to the second transceiver via the galvanic isolation link; and receives, from the second transceiver and via the galvanic isolation link, second data signals in response to the first data signals, wherein: the data signals are transmitted in consecutive time slots of a determined time duration via a galvanic isolation link; the first data signals include: polling signals transmitted from the transceiver to the second transceiver during consecutive time slots; and on-demand access requests transmitted from the transceiver to the second transceiver; and the second data signals include: status response signals transmitted from the second transceiver to the transceiver in response to polling signals; and access response signals transmitted from the second transceiver to the transceiver in response to access requests. In an embodiment, the transceiver, in operation, sends a busy state signal to the processor, the busy state signal indicating pending reception of the status response signal. In an embodiment, the transceiver, in operation: detects an absence of data signals being transmitted between the transceiver and the second transceiver via the galvanic isolation link, the detecting including determining whether a threshold number of consecutive time slots have elapsed without a data signal being transmitted between the transceiver and the second transceiver via said galvanic isolation link; and responds to the detecting of the absence of data signals being transmitted by: resetting one or both of the transceiver and the second transceiver; and transmitting a first data signal to the second transceiver via the galvanic isolation link.

In an embodiment, a transceiver comprises: control circuitry, which, in operation, couples to a high-voltage device; and an interface, which, in operation, couples the transceiver to a second transceiver via a galvanic isolation link, wherein, the transceiver, in operation, responds to first data signals received from the second transceiver via the galvanic isolation link by transmitting second data signals in response to the first data signals, wherein: the data signals are transmitted in consecutive time slots of a determined time duration via a galvanic isolation link; the first data signals include: polling signals transmitted from the second transceiver to the transceiver during consecutive time slots; and on-demand access requests transmitted from the second transceiver to the transceiver; and the second data signals include: status response signals transmitted from the transceiver to the second transceiver in response to polling signals; and access response signals transmitted from the transceiver to the second transceiver in response to access requests. In an embodiment, the transceiver, in operation: stores a response to an access request; transmits a status response signal before transmission of an access response signal associated with the stored response; and transmits, after the transmission of the status response signal, the access response signal associated with the stored response. In an embodiment, the transceiver comprises registers having register addresses, wherein: the polling signals comprise a first type of access requests to access single register addresses of the register addresses of the second transceiver; and the on-demand access requests comprise a second type of access requests to access plural register addresses of the register addresses of the second transceiver. In an embodiment, the transceiver, in operation: detects an absence of data signals being transmitted between the transceiver and the second transceiver via the galvanic isolation link, the detecting including determining whether a threshold number of consecutive time slots have elapsed without a data signal being transmitted between the first transceiver and the second transceiver via said galvanic isolation link; and responds to the detecting of the absence of data signals being transmitted by resetting one or both of the transceiver and the second transceiver.

In an embodiment, a non-transitory computer-readable medium's contents configure a communication system to perform a method, the method comprising: transmitting first data signals from a first circuit to a second circuit of the communication system; and transmitting second data signals from the second circuit to the first circuit in response to the first data signals, wherein: the data signals are transmitted in consecutive time slots of a determined time duration via a galvanic isolation link coupled between the first circuit and the second circuit; the first data signals include: polling signals transmitted from the first circuit to the second circuit during consecutive time slots; and on-demand access requests transmitted from the first circuit to the second circuit; and the second data signals include: status response signals transmitted from the second circuit to the first circuit in response to polling signals received from the first circuit; and access response signals transmitted from the second circuit to the first circuit in response to access requests received from the first circuit. In an embodiment, the method comprises: storing, in the second circuit, a response to an access request; transmitting, by the second circuit, of a status response signal before transmission of an access response signal associated with the stored response; and transmitting, by the second circuit after the transmission of the status response signal, the access response signal associated with the stored response. In an embodiment, the contents comprise sets of instructions, which, when respectively executed by the first circuit and the second circuit, cause the communication system to perform the method.

Without prejudice to the underlying principles, the details and embodiments may vary, even significantly, with respect to what has been described by way of example only without departing from the extent of protection.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
transmitting first data signals from a first circuit to a second circuit;
transmitting second data signals from the second circuit to the first circuit in response to the first data signals, wherein:
the first data signals and the second data signals are transmitted in consecutive time slots of a determined time duration via a galvanic isolation link coupled between the first circuit and the second circuit;
the first data signals include:
polling signals transmitted from the first circuit to the second circuit during consecutive time slots; and
on-demand access requests transmitted from the first circuit to the second circuit; and
the second data signals include:
status response signals transmitted from the second circuit to the first circuit in response to the polling signals received from the first circuit; and
access response signals transmitted from the second circuit to the first circuit in response to the on-demand access requests received from the first circuit;
storing, in the second circuit, a response to an access request;
transmitting, by the second circuit, a status response signal before transmission of an access response signal associated with the stored response; and
transmitting, by the second circuit after the transmission of the status response signal, the access response signal associated with the stored response.

2. The method of claim 1, further comprising:
sending, by the first circuit to a controller coupled to the first circuit, a busy state signal indicative of pending completion of transmission of the status response signal by the second circuit to the first circuit.

3. The method of claim 1, wherein:
the second circuit includes registers;
the polling signals transmitted from the first circuit to the second circuit comprise a first type of access requests to access the registers in the second circuit; and
the on-demand access requests transmitted from the first circuit to the second circuit comprise a second type of access requests to access the registers in the second circuit, the second type of access requests being different from the first type of access requests.

4. The method of claim 3, wherein:
the registers in the second circuit have register addresses;
the first type of access requests are directed to single addresses of the register addresses of the second circuit; and
the second type of access requests are directed to plural register addresses of the second circuit.

5. The method of claim 1, wherein:
the first data signals and the second data signals are mutually non-overlapping;
the first data signals and the second data signals comprise a same number of bits;
the first data signals and the second data signals comprise digitally-encoded signals;
the polling signals transmitted from the first circuit to the second circuit and the status response signals transmitted from the second circuit to the first circuit comprise constant-content digital signals; or
combinations thereof.

6. The method of claim 5, further comprising encoding the digitally encoded signals using Manchester code.

7. The method of claim 1, further comprising:
detecting an absence of data signals being transmitted between the first circuit and the second circuit via the galvanic isolation link; and
responding to the detecting of the absence of data signals being transmitted between the first circuit and the second circuit via the galvanic isolation link by:
resetting one or both of the first circuit and the second circuit; and
transmitting a first data signal from the first circuit to the second circuit.

8. The method of claim 7, wherein the detecting comprises:
determining, using one of the first circuit or the second circuit, whether a threshold number of consecutive time slots have elapsed without a data signal being transmitted between the first circuit and the second circuit via the galvanic isolation link.

9. A system, comprising:
a first transceiver;
a second transceiver; and
a galvanic isolation link coupled between a first circuit and a second circuit, wherein,
the first transceiver transmits first data signals to the second transceiver via the galvanic isolation link; and
the second transceiver transmits, via the galvanic isolation link, second data signals to the first transceiver in response to the first data signals, wherein,
the first data signals and the second data signals are transmitted in consecutive time slots of a determined time duration via flail the galvanic isolation link coupled between the first circuit and the second circuit;
the first data signals include:
polling signals transmitted from the first transceiver to the second transceiver during consecutive time slots; and
on-demand access requests transmitted from the first transceiver to the second transceiver; and
the second data signals include:
status response signals transmitted from the second transceiver to the first transceiver in response to the polling signals received from the first transceiver; and
access response signals transmitted from the second transceiver to the first transceiver in response to the on-demand access requests received from the first transceiver, wherein the second transceiver is configured to:
store a response to an access request;
transmit a status response signal before transmission of an access response signal associated with the stored response; and
transmit, after the transmission of the status response signal, the access response signal associated with the stored response.

10. The system of claim 9, wherein the first transceiver, sends a busy state signal to a controller coupled to the first circuit, the busy state signal indicating pending reception of the status response signal.

11. The system of claim 9, wherein:
the second transceiver includes registers having register addresses;
the polling signals transmitted from the first transceiver to the second transceiver comprise a first type of access requests to access single register addresses of the register addresses of the second transceiver; and
the on-demand access requests transmitted from the first transceiver to the second transceiver comprise a second type of access requests to access plural register addresses of the register addresses of the second transceiver.

12. The system of claim 9, wherein,
the first transceiver is configured to:
detect an absence of data signals being transmitted between the first transceiver and the second transceiver via the galvanic isolation link, the detecting including determining whether a threshold number of consecutive time slots have elapsed without a data signal being transmitted between the first transceiver and the second transceiver via the galvanic isolation link; and
respond to the detecting of the absence of data signals being transmitted by:
resetting one or both of the first transceiver and the second transceiver; and
transmitting a first data signal to the second transceiver via the galvanic isolation link.

13. The system of claim 9, further comprising a controller coupled to the first transceiver, wherein:
the controller is configured to send an on-demand access request to the first transceiver; and
the first transceiver is configured to:
forward the on-demand access request to the second transceiver via the galvanic isolation link;
receive a response to the on-demand access request from the second transceiver via the galvanic isolation link; and
forward the response to the on-demand access request to the controller.

14. The system of claim 9, wherein:
the first transceiver comprises a low-voltage circuit configured to generate signals to control a high-voltage device; and
the second transceiver is coupled to the high-voltage device, wherein the galvanic isolation link isolates the low-voltage control circuit with respect to the high-voltage device.

15. The system of claim 14, further comprising the high-voltage device.

16. A transceiver, comprising:
control circuitry configured to couple to a controller; and
an interface configured to couple the transceiver to a second transceiver via a galvanic isolation link, wherein, the transceiver is configured to:
transmit first data signals to the second transceiver via the galvanic isolation link; and
receive, from the second transceiver and via the galvanic isolation link, second data signals in response to the first data signals, wherein:
the first data signals and the second data signals are transmitted in consecutive time slots of a determined time duration via the galvanic isolation link;
the first data signals include:
polling signals transmitted from the transceiver to the second transceiver during consecutive time slots; and on-demand access requests transmitted from the transceiver to the second transceiver; and the second data signals include:

status response signals transmitted from the second transceiver to the transceiver in response to the polling signals; and access response signals transmitted from the second transceiver to the transceiver in response to the on-demand access requests, wherein the transceiver is configured to send a busy state signal to the controller, the busy state signal indicating pending reception of a status response signal.

17. The transceiver of claim 16, wherein the transceiver is further configured to:

detect an absence of data signals being transmitted between the transceiver and the second transceiver via the galvanic isolation link, the detecting including determining whether a threshold number of consecutive time slots have elapsed without a data signal being transmitted between the transceiver and the second transceiver via the galvanic isolation link; and respond to the detecting of the absence of data signals being transmitted by:

resetting one or both of the transceiver and the second transceiver; and transmitting a first data signal to the second transceiver via the galvanic isolation link.

18. The transceiver of claim 16, wherein the second transceiver is coupled to a high-voltage device.

19. A transceiver, comprising:

control circuitry configured to couple to a high-voltage device; and an interface configured to couple the transceiver to a second transceiver via a galvanic isolation link, wherein, the transceiver responds to first data signals received from the second transceiver via the galvanic isolation link by transmitting second data signals in response to the first data signals, wherein:

the first data signals and the second data signals are transmitted in consecutive time slots of a determined time duration via the galvanic isolation link;

the first data signals include:

polling signals transmitted from the second transceiver to the transceiver during consecutive time slots; and on-demand access requests transmitted from the second transceiver to the transceiver; and the second data signals include:

status response signals transmitted from the transceiver to the second transceiver in response to the polling signals; and access response signals transmitted from the transceiver to the second transceiver in response to the on-demand access requests, wherein the transceiver is configured to:

store a response to an access request;

transmit a status response signal before transmission of an access response signal associated with the stored response; and transmit, after the transmission of the status response signal, the access response signal associated with the stored response.

20. The transceiver of claim 19, further comprising registers having register addresses, wherein:

the polling signals comprise a first type of access requests to access single register addresses of the register addresses of the second transceiver; and the on-demand access requests comprise a second type of access requests to access plural register addresses of the register addresses of the second transceiver.

21. The transceiver of claim 19, wherein, the transceiver is further configured to:

detect an absence of data signals being transmitted between the transceiver and the second transceiver via the galvanic isolation link, the detecting including determining whether a threshold number of consecutive time slots have elapsed without a data signal being transmitted between the transceiver and the second transceiver via the galvanic isolation link; and respond to the detecting of the absence of data signals being transmitted by resetting one or both of the transceiver and the second transceiver.

22. A non-transitory computer-readable storage medium storing instructions that, when executed, cause a communication system to perform a method, the method comprising:

transmitting first data signals from a first circuit to a second circuit of the communication system;

transmitting second data signals from the second circuit to the first circuit in response to the first data signals, wherein:

the first data signals and the second data signals are transmitted in consecutive time slots of a determined time duration via a galvanic isolation link coupled between the first circuit and the second circuit;

the first data signals include:

polling signals transmitted from the first circuit to the second circuit during consecutive time slots; and on-demand access requests transmitted from the first circuit to the second circuit; and the second data signals include:

status response signals transmitted from the second circuit to the first circuit in response to the polling signals received from the first circuit; and access response signals transmitted from the second circuit to the first circuit in response to the on-demand access requests received from the first circuit;

storing, in the second circuit, a response to an access request;

transmitting, by the second circuit, a status response signal before transmission of an access response signal associated with the stored response; and transmitting, by the second circuit after the transmission of the status response signal, the access response signal associated with the stored response.

23. The non-transitory computer readable storage medium of claim 22, wherein the method further comprises sending, by the first circuit to a controller coupled to the first circuit, a busy state signal indicative of pending completion of transmission of the status response signal by the second circuit to the first circuit.

24. The non-transitory computer readable storage medium of claim 22, wherein the instructions comprise sets of instructions, which, when respectively executed by the first circuit and the second circuit, cause the communication system to perform the method.

\* \* \* \* \*

UNITED STATES PATENT AND TRADEMARK OFFICE
CERTIFICATE OF CORRECTION

| | |
|---|---|
| PATENT NO. | : 11,575,404 B2 |
| APPLICATION NO. | : 17/480926 |
| DATED | : February 7, 2023 |
| INVENTOR(S) | : Lucia Maggio et al. |

It is certified that error appears in the above-identified patent and that said Letters Patent is hereby corrected as shown below:

In the Claims

Column 17, Line 39, Claim 9:
"via flail the galvanic" should read: --via the galvanic--.

Signed and Sealed this
Twenty-first Day of March, 2023

Katherine Kelly Vidal
Director of the United States Patent and Trademark Office